US008212163B2

(12) United States Patent
Park et al.

(10) Patent No.: US 8,212,163 B2
(45) Date of Patent: Jul. 3, 2012

(54) WITHDRAWABLE DEVICE OF VACUUM CIRCUIT BREAKER

(75) Inventors: Woo Jin Park, Chungcheongbuk-Do (KR); Hyun Jae Kim, Chungcheongbuk-Do (KR)

(73) Assignee: LS Industrial Systems Co., Ltd., Gyeonggi-Do (KR)

( * ) Notice: Subject to any disclaimer, the term of this patent is extended or adjusted under 35 U.S.C. 154(b) by 64 days.

(21) Appl. No.: 12/780,113

(22) Filed: May 14, 2010

(65) Prior Publication Data
US 2010/0294630 A1 Nov. 25, 2010

(30) Foreign Application Priority Data

May 21, 2009 (KR) .................. 10-2009-0044697

(51) Int. Cl.
*H01H 9/20* (2006.01)
(52) U.S. Cl. .................... 200/50.21; 200/50.25
(58) Field of Classification Search ............ 200/50.21, 200/50.25, 50.26
See application file for complete search history.

(56) References Cited

U.S. PATENT DOCUMENTS

| 3,783,209 | A | * | 1/1974 | Cleaveland et al. | ........ 200/50.25 |
| 4,139,748 | A | * | 2/1979 | Wolfe et al. | ............... 200/50.26 |
| 4,262,175 | A | * | 4/1981 | Rexroad et al. | ............ 200/50.21 |
| 5,120,913 | A | * | 6/1992 | Leach et al. | ............... 200/50.26 |
| 2009/0015990 | A1 | | 1/2009 | Kim et al. | |
| 2010/0230257 | A1 | * | 9/2010 | Kim et al. | .................. 200/50.25 |

FOREIGN PATENT DOCUMENTS

| JP | 61-98103 | 5/1986 |
| JP | 9-130930 | 5/1997 |
| JP | 2008-104345 | 5/2008 |
| JP | 2010-212242 | 9/2010 |
| JP | 2010-213567 | 9/2010 |
| KR | 10-2004-0092599 | 11/2004 |

OTHER PUBLICATIONS

Korea Office action, mail date is Mar. 17, 2011.
Hyun Jae Kim et al., "Withdrawable Device of Main Circuit for Vacuum Circuit Breaker", U.S. Appl. No. 12/645,620, filed Dec. 2009, PP.
Jae-Yong Lee et al., "Apparatus for Preventing Withdrawing or Inserting of Carriage in Circuit Breaker", U.S. Appl. No. 12/718,121, filed Mar. 2010, PP.
Woo Jin Park et al., "Device for Preventing Withdrawing and Inserting of a Circuit Breaker", U.S. Appl. No. 12/816,536, filed Jun. 2010, PP.
Japan Office action, dated Mar. 27, 2012 along with an english translation thereof.

* cited by examiner

*Primary Examiner* — Truc Nguyen
(74) *Attorney, Agent, or Firm* — Greenblum & Bernstein P.L.C.

(57) ABSTRACT

A withdrawable device of a vacuum circuit breaker for transferring a vacuum circuit breaker received in a cradle, includes: a carriage on which the vacuum circuit breaker is loaded; a first transfer unit fixed to the carriage; a second transfer unit installed at one side of the cradle such that it can be driven, and transferring a transfer force to the first transfer unit; and a transfer limiting unit for selectively limiting driving of the second transfer unit.

14 Claims, 8 Drawing Sheets

Prior Art

Prior Art

Prior Art

WITHDRAWABLE DEVICE OF VACUUM CIRCUIT BREAKER

BACKGROUND OF THE INVENTION

1. Field of the Invention

The present invention relates to a withdrawable device of a vacuum circuit breaker for inserting and withdrawing a vacuum circuit breaker in order to connect and disconnect power terminals.

2. Description of the Related Art

In general, a vacuum circuit breaker is an electric device for switching a normal current and blocking a fault current as occurred by a signal such as a relay.

The vacuum circuit breaker extinguishes an arc generated when the vacuum circuit breaker breaks, in a vacuum container to quickly separate a circuit, thus protecting the circuit and device.

The vacuum circuit breaker is generally installed in a circuit breaker chamber of a distributing board. Usually, in the vacuum circuit breaker, electricity flows from a main line (i.e., to which electric is incoming) to a load side (i.e., from which electricity is outgoing), and when the vacuum circuit breaker or the distributing board is inspected or when the vacuum circuit breaker or the distributing board needs repairing, contact points of the vacuum circuit breaker are separated, the vacuum circuit breaker is withdrawn to a location at which it is sufficiently insulated from a power source of the main line, and then the circuit breaker is inspected or repaired.

A withdrawable device of the related art vacuum circuit breaker will now be described with reference to the accompanying drawings.

FIG. 1 is a perspective view showing the configuration of the related art vacuum circuit breaker. FIGS. 2 and 3 are perspective views of the withdrawable device of the related art vacuum circuit breaker. FIG. 4 is a sectional view showing the configuration of the withdrawable device of the related art vacuum circuit breaker. FIG. 5 illustrates a braking unit in a safe state according to the related art. FIG. 6 illustrates the braking unit in an operational state according to the related art.

First, with reference to FIG. 1, a withdrawable device 500 of the related art vacuum circuit breaker includes a carriage 100, on which a circuit breaker main body 140 having a main circuit 141 which is coupled to or separated from a mounting frame 130 installed at a rear side of a cradle 120 is loaded such that it can be transferred (or conveyed), a carriage moving unit 200 for moving the carriage 100 in a forward/backward direction, a braking unit for limiting a transfer distance of the carriage 100 being transferred by the carriage moving unit 200, and a girder assembly 300 supporting the carriage moving unit 200.

The carriage 100 includes a box body 101 having an upper portion opened and including a wall body 101a formed with a certain height on an outer circumferential surface, and two pairs of wheels 102 form on both sides of the box body 101 such that the are inserted or withdrawn along a guide rail (not shown) installed at an inner side of both side walls of the cradle 120.

With reference to FIGS. 2 and 4, the carriage moving unit 200 includes a lead screw 201 inserted in a forward/backward direction of a through hole 101b formed on the front wall body 101a of the box body 101, a transfer nut 202 installed at an inner side of the front wall body 101a of the box body in a state of being threaded with the lead screw 201, a channel-shaped bracket 203 for fixing the transfer nut 202 to the box body 101, and a handle 213 detachably installed at a front end portion of the lead screw 201 in order to rotate the lead screw 201 forward and backward.

The transfer nut 202 includes a female screw unit threaded with an outer circumferential surface of the lead screw 201. Two guide recesses 202b having both end portions whose depths are different are formed on front and rear surfaces of the transfer nut 202. A guide groove 202c is formed on an outer circumferential surface of the transfer nut 202.

A girder 209 fixed to a rear end portion of the lead screw 201 may be movable in a forward and backward direction without wobbling on a pair of travel rails 212 and 212' installed in a lengthwise direction on an inner side of the box body 101 of the carriage 100.

The girder assembly 300 includes a support structure 303 having a space part formed at an inner side thereof and having a bearing 214 supporting to transfer rotary power to the front end portion of the lead screw 201 that passes through a fixing hole formed at the center thereof, left and right sliding plates (not shown) installed to be movable in a left and right direction at both inner sides of the support structure 303, left and right handles 305 and 305' fixed to the left and right sliding plates and installed to be protruded outwardly from the support structure 303, and a spring (not shown) for moving the left and right sliding plates to insert an end portion 304a into the both side walls of the cradle 120.

A braking unit 204 is installed near the transfer nut 202 and selectively constraining a rotation of the transfer nut 202 by interworking with guide recesses 202b and 202c formed on the transfer nut 202.

The position of the circuit breaker main body 140 loaded on the carriage 100 is fixed by means of the braking unit 204.

The operation of fixing the position of the circuit breaker main body 140 by means of the braking unit 204 will now be described with reference to FIGS. 5 and 6.

As shown in FIGS. 5 and 6, as for the braking unit 204, forward and backward rotation preventing pins 205 and 205' are installed in a diagonal direction of the bracket 203 such that they can be inserted into the guide recesses 202b formed on the front and rear surfaces of the transfer nut 202. The forward and backward rotation preventing pins 205 and 205' are connected with left and right driving pins 207 and 207' by means of connection plates 206 and 206'. The left and right driving pins 207 and 207' are elastically supported by springs 208 and 208'. The left and right driving pins 207 and 207' are pressed by the girder 209 and the girder assembly 300 installed at the end portions of the lead screw 2201 when the carriage 100 moves forward and backward. A pair of support plates 211 and 211' are installed at a certain interval in a vertical direction of the bracket 203 so that a guide pin 210 for positioning the transfer nut 202 can be inserted into the guide recess 202c of the transfer nut 202 when the forward rotation preventing pin 205 or the backward rotation preventing pin 205' is released from the guide recess 202b of the transfer nut 202 by the left and right driving pins 207 and 207'.

The rotation of the transfer nut 202 moving in the forward and backward direction of the lead screw 201 is restrained by the braking unit 204. In this case, when the carriage 100 has moved forward completely (so as to be at a testing position), the transfer nut 202 completely moves backward along the lead screw 201, so the right driving pin 207' is brought into contact with one side of the girder assembly 300, the backward rotation preventing pin 205' is released from the guide recess 202b of the transfer nut 202, and the transfer nut 202 is idly rotated, thus preventing the carriage 100 from moving any further.

When the carriage 100 has completely moved backward (so as to be at an operation position), the transfer nut 202 moves completely to the rear side along the lead screw 201, the left driving pin 207 is brought into contact with the side of the girder 209 installed at the rear end portion of the lead screw 201, the forward rotation preventing pin 205 is released from the guide recess 202b of the transfer nut 202, and the transfer nut 202 is idly rotated, thus preventing the carriage 100 from moving any further.

However, the withdrawable device of the vacuum circuit breaker has the following problem. That is, when the carriage 100 is at the testing position, the carriage 100 is simply prevented from moving forward by means of the braking unit 204 and the backward rotation preventing pin 205' interworking with the braking unit 204, while the carriage 100 cannot be prevented from changing in its position to the front side when an external force (vibration, an impact, etc.) is applied to the lead screw 201.

Based on the same principle, when the carriage 100 is at the operation position, the carriage 100 is simply prevented from moving backward by means of the braking unit 204 and the forward rotation preventing pin 205 interworking with the braking unit 204, while the carriage 100 cannot be prevented from changing in its position to the rear side when an external force (vibration, an impact, etc.) is applied to the lead screw 201.

In case of the operation position, the change in the position of the carriage 100 is likely to cause a short-circuit incident, and in the occurrence of the short-circuit incident, it makes the contact state of an electrical contact portion unstable to possibly bring about an additional incident.

Also, in case of the testing position, the contact point of the vacuum circuit breaker cannot be separated up to a position at which the vacuum circuit breaker is sufficiently insulated from the power surface of the main line, having a dangerousness of causing a safety accident.

SUMMARY OF THE INVENTION

Therefore, in order to address the above matters, the various features described herein have been conceived.

An aspect of the present invention provides a withdrawable device of a vacuum circuit breaker capable of preventing the vacuum circuit breaker from changing at its inserted or withdrawn position by an external force (vibration, impact, and the like) applied to the vacuum circuit breaker.

According to an aspect of the present invention, there is provided a withdrawable device of a vacuum circuit breaker for transferring a vacuum circuit breaker received in a cradle, including: a carriage on which the vacuum circuit breaker is loaded; a first transfer unit fixed to the carriage; a second transfer unit installed at one side of the cradle such that it can be driven, and transferring a transfer force to the first transfer unit; and a transfer limiting unit for selectively limiting driving of the second transfer unit.

One side of the second transfer unit may be bearing-supported at a girder portion, whose both ends are fixed to both sides of the cradle, so as to be axially rotatable.

When the second transfer unit is rotated, the first transfer unit moves in an axial direction of the second transfer unit.

The first transfer unit may be provided as a nut member having a female screw unit, and the second transfer unit may be provided as a shaft member having a male screw unit formed on an outer circumferential surface thereof such that it corresponds to the female screw unit of the nut member.

The male screw unit of the second transfer unit may be installed in a transfer direction of the first transfer unit.

The transfer limiting unit may selectively limit a forward and reverse rotation of the second transfer unit.

When a lever detachably fastened to one end portion of the second transfer unit to rotate the second transfer unit is separated, the transfer limiting unit may limit the rotation of the second transfer unit.

The transfer limiting unit may include: a first polygonal protrusion portion formed at one end portion of the second transfer unit coupled with the lever and having a vertical section in a polygonal shape with respect to the direction in which the lever is fastened to one end portion; a first transfer limiting member having a transfer limiting hole formed to correspond to the vertical section of the first polygonal protrusion portion with respect to the fastening direction of the lever; and an elastic support unit elastically supporting the first transfer limiting member such that a force of restitution is provided in a direction in which the lever is separated.

The first polygonal protrusion portion may be provided as a polygonal nut screw-coupled to the second transfer unit, and the first polygonal protrusion portion and the second transfer unit are coupled by a coupling wedge penetrating the first polygonal protrusion portion and the second transfer unit.

A first polygonal recess portion corresponding to the first polygonal protrusion portion may be formed at the end portion fastened to the first polygonal protrusion portion.

The depth of the first polygonal recess portion may be longer than the length of the first polygonal protrusion portion.

A minimum radius of an outer circumscribed circle of the first polygonal protrusion portion may be larger than the radius of the second transfer unit.

The elastic support unit may be provided between a front surface of the girder portion and a rear surface of the first transfer limiting member, and may be provided as two or more compression springs.

The transfer limiting unit may include: a guide unit including a guide protrusion formed to be protruded from one of the front surface of the girder portion and the rear surface of the first transfer limiting member toward the fastening direction of the lever, and a guide recess formed at the other to allow the guide protrusion to be inserted therein and guiding a movement direction of the first transfer limiting member.

The guide unit may be formed as the elastic support unit is inserted into the guide protrusion.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 illustrates the braking unit in an operation state according to the related art.

DETAILED DESCRIPTION OF THE INVENTION

Figure 1:
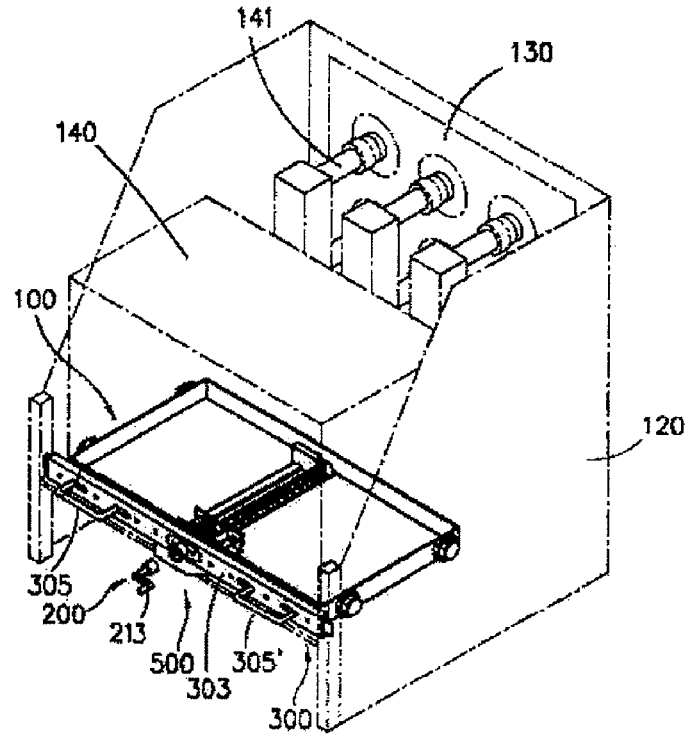
FIG. 1 is a perspective view showing the configuration of the related art vacuum circuit breaker.
Figure 2:
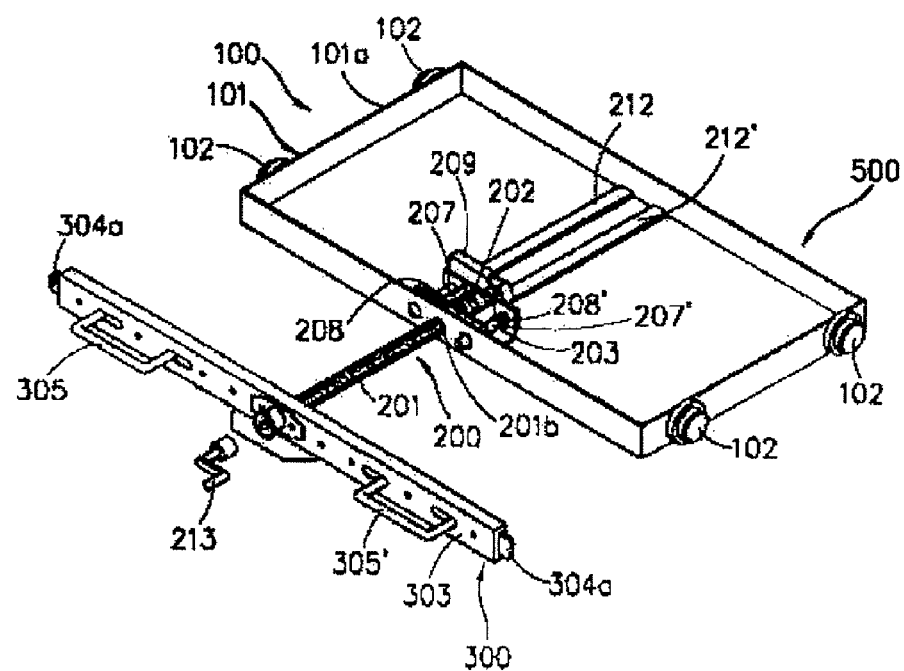
FIGS. 2 and 3 are perspective views of the withdrawable device of the related art vacuum circuit breaker.
Figure 3:
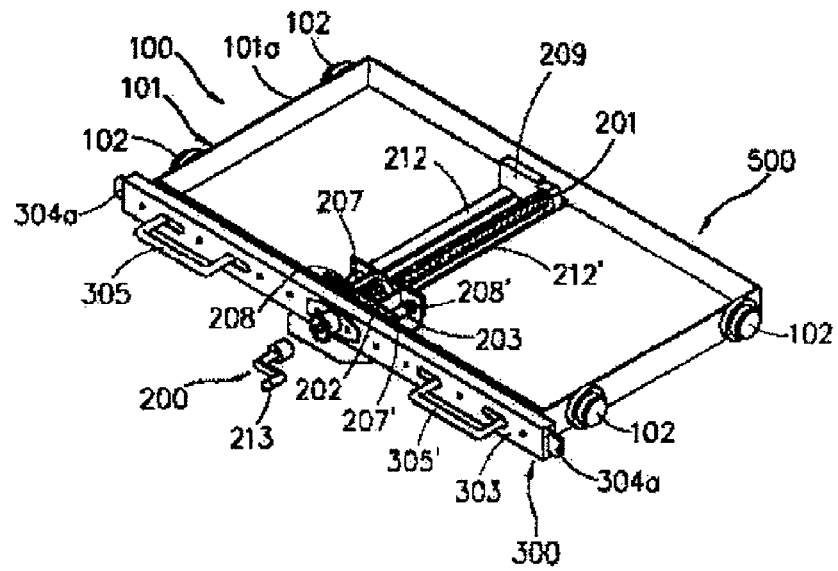
Figure 4:
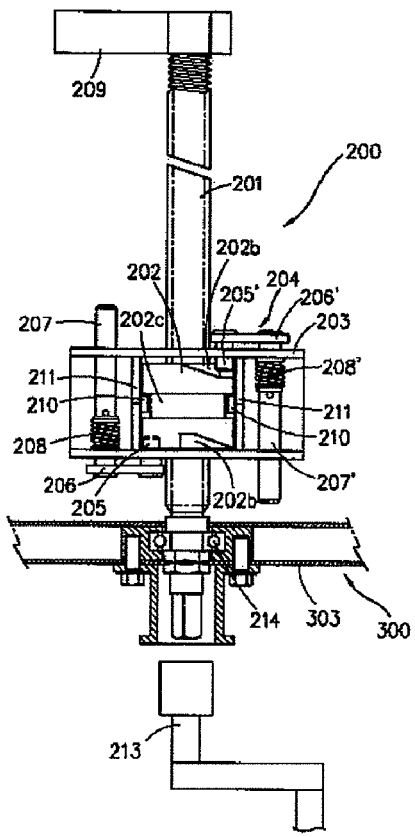
FIG. 4 is a sectional view showing the configuration of the withdrawable device of the related art vacuum circuit breaker.
Figure 5:
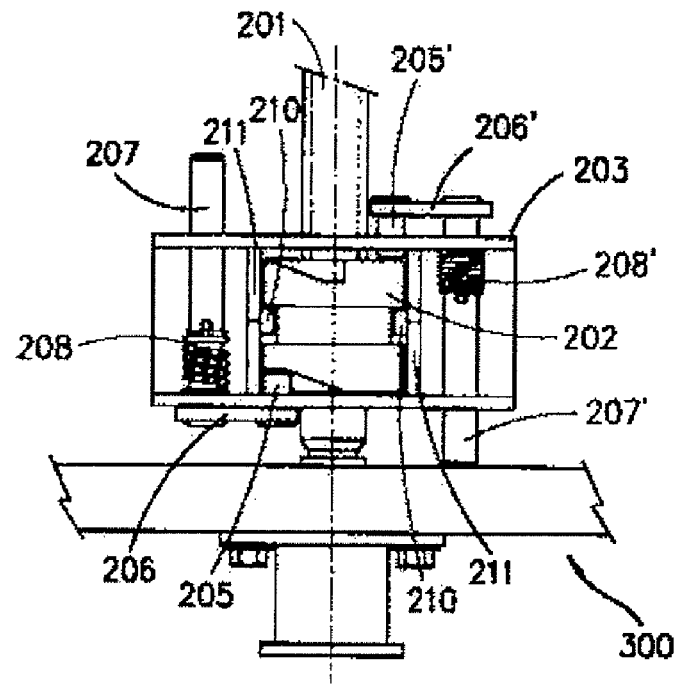
FIG. 5 illustrates a braking unit in a safe state according to the related art.
Figure 6:
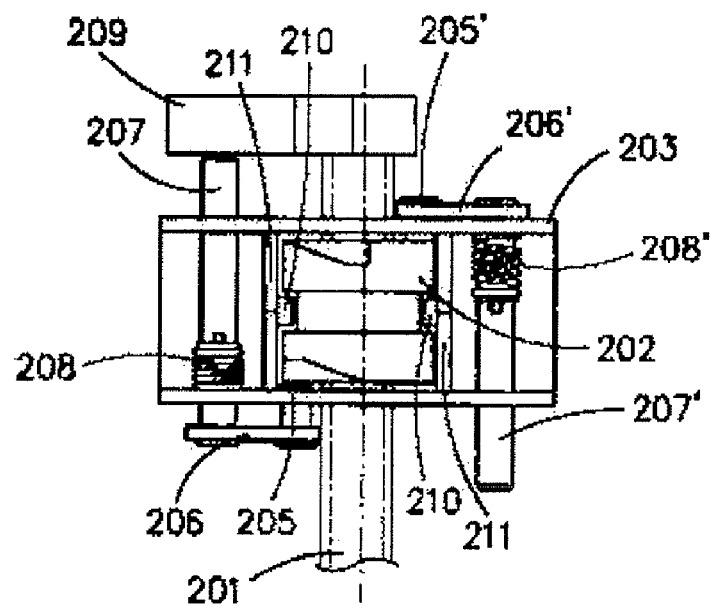
FIG. 6 illustrates the braking unit in an operational state according to the related art.

A withdrawable device of a vacuum circuit breaker according to an exemplary embodiment of the present invention will now be described in detail with reference to the accompanying drawings.

In the following description, usage of suffixes such as 'module', 'part' or 'unit' used for referring to elements is given merely to facilitate explanation of the present invention, without having any significant meaning by itself.

In the following description of the present invention, the same or similar reference numerals are used for the same or similar elements although they belong to different exemplary embodiments, and a detailed description thereof will use the description of the first exemplary embodiment of the present invention.

As used herein, the singular forms "a", "an" and "the" are intended to include the plural forms as well, unless the context clearly indicates otherwise.

First, the withdrawable device of a vacuum circuit breaker according to a first exemplary embodiment of the present invention will now be described in detail with reference to the accompanying drawings.

Figure 7:
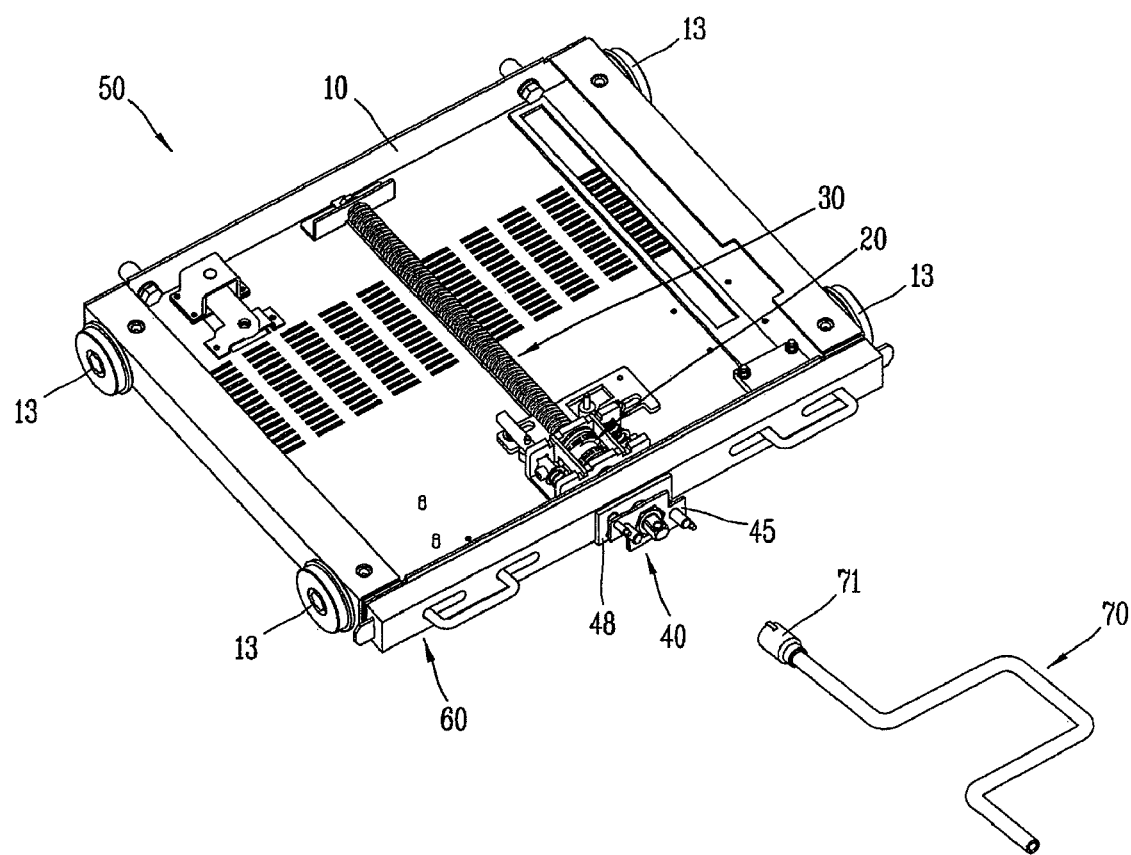
FIG. 7 is a perspective view of a withdrawable device of a vacuum circuit breaker according to an exemplary embodiment of the present invention.

FIG. 7 is a perspective view of a withdrawable device of a vacuum circuit breaker according to an exemplary embodiment of the present invention.

With reference to FIG. 7, the withdrawable device 50 of a vacuum circuit breaker according to an exemplary embodiment of the present invention includes a carriage 10 serving as a loading unit of the vacuum circuit breaker, first and second transfer units 20 and 30 serving as transfer means, and a transfer limiting unit 40 for preventing a change in the location of the vacuum circuit breaker.

Also, like the withdrawable device 500 of the related art vacuum circuit breaker as described above, a braking unit 2204 may be provided to limit a transfer distance of the carriage 100.

In order to clarify the gist of the present invention, drawings following FIG. 7 illustrate a state in which the braking unit 204 is separated, and a description of the braking unit 204 will use that of the related art, instead.

The girder assembly 300 for supporting the transfer unit in describing the withdrawable device 500 of the related art vacuum circuit breaker will be referred to as a 'girder portion' hereinafter.

The carriage 10 has a box-like shape with an upper side open and having a wall body with a certain height formed on an outer circumferential surface.

The vacuum circuit breaker is loaded on an upper surface of the carriage 10. Also, it is accommodated in a cradle defined as a box accommodating the carriage 10.

Wheel members 13 may be formed at both sides of the carriage 10 such that they can be led in or out along a guide rail (not shown) installed at both side walls within the cradle. Two pairs of wheel members 13 are provided for a stable insertion and withdrawal operation.

The first transfer unit 200 is fixed to a lower surface within the carriage 10, and couple to the second transfer unit 30 such that the first transfer unit 20 can make a relative movement with respect to the second transfer unit 30.

Namely, when the second transfer unit 30 rotates, the first transfer unit 20 moves in an axial direction of the second transfer unit 30.

The second transfer unit 30 is installed on the cradle such that it can be driven to transfer a transfer force to the first transfer unit 20.

To this end, the second transfer unit 30 is positioned on a front surface of the cradle and installed at a girder portion 60 installed to be supported by both sides within the cradle.

The second transfer unit 30 is formed as a shaft member placed in a rear direction from the front side of the cradle, and coupled to be supported by the girder portion 60 so as to axially rotate by a bearing.

Also, a male screw unit is formed on an outer surface of the second transfer unit 30, and the first transfer unit 20 is formed as a nut member having a female screw unit formed therein.

The second transfer unit 30 is rotated by a lever 70 fastened to the end portion of the second transfer unit 30 to apply a rotary force to the second transfer unit 30.

Figure 8:
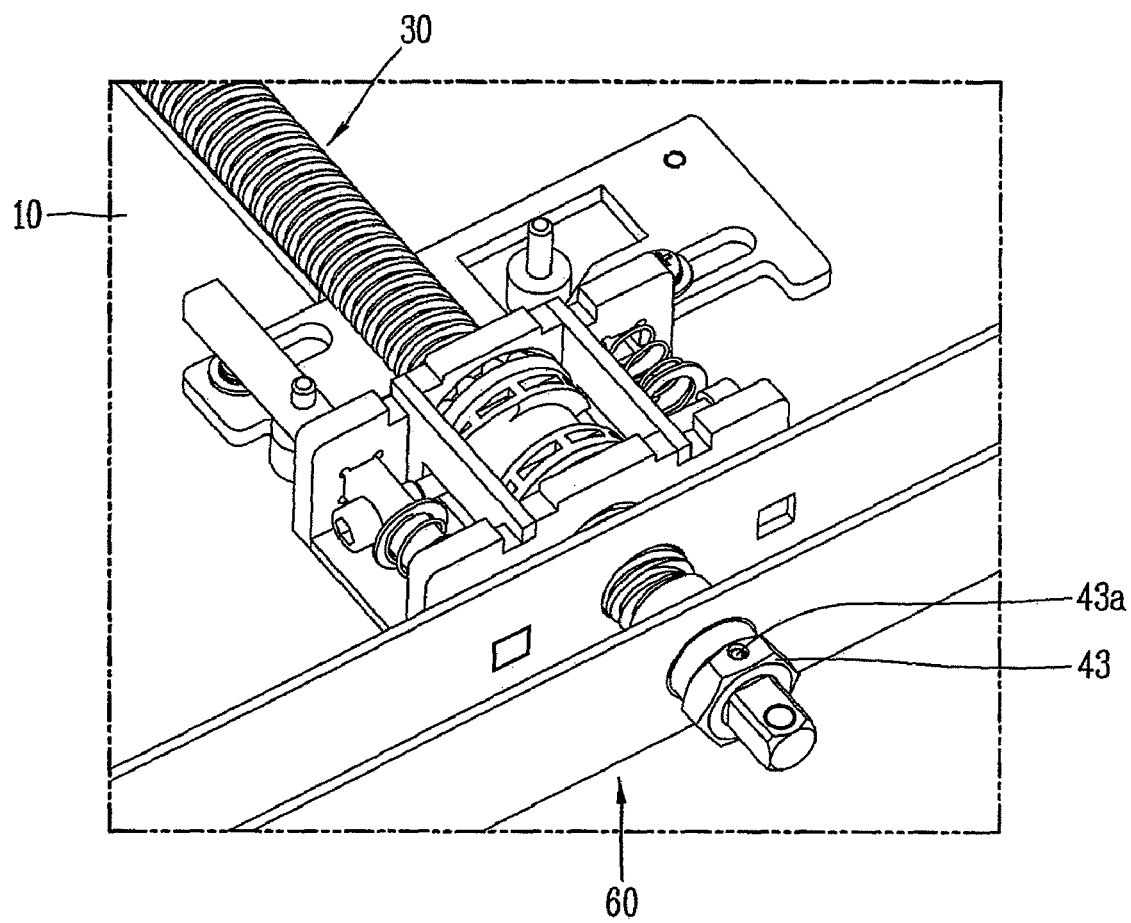
FIGS. 8 and 9 are enlarged perspective views of a transfer limiting unit of FIG. 7.
Figure 9:
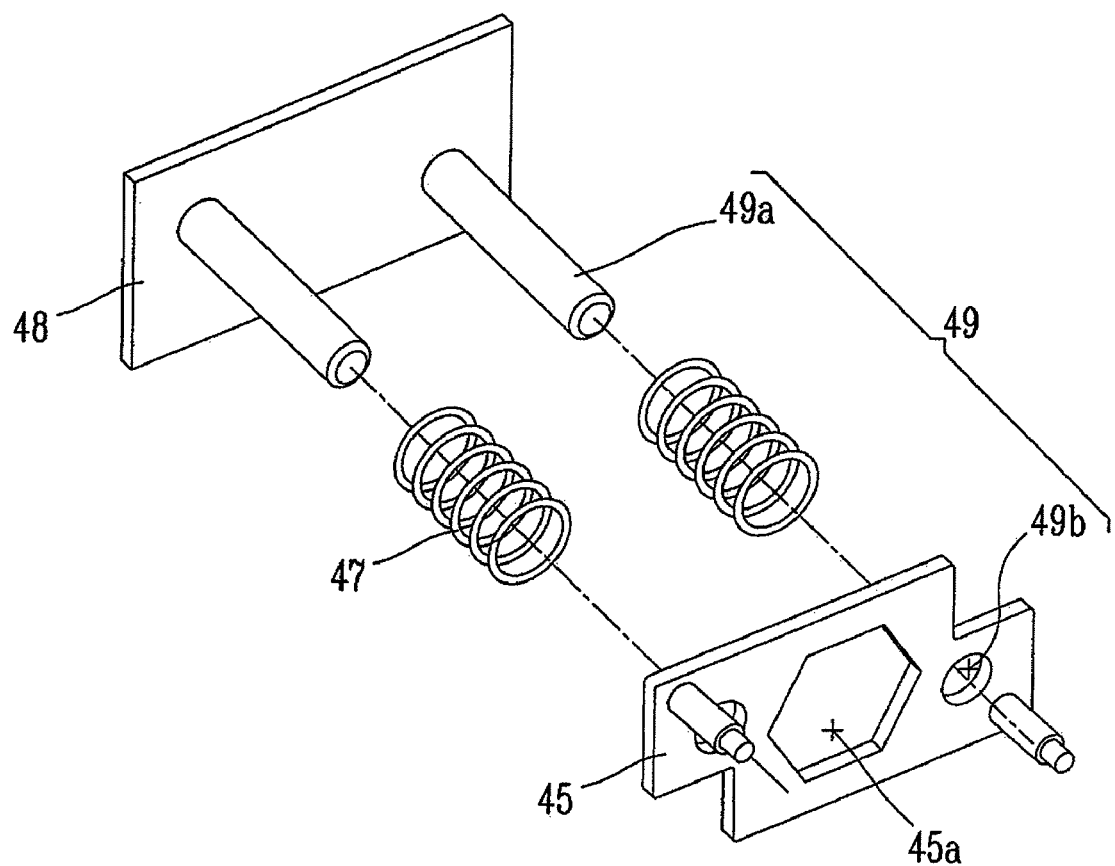
Figure 10:
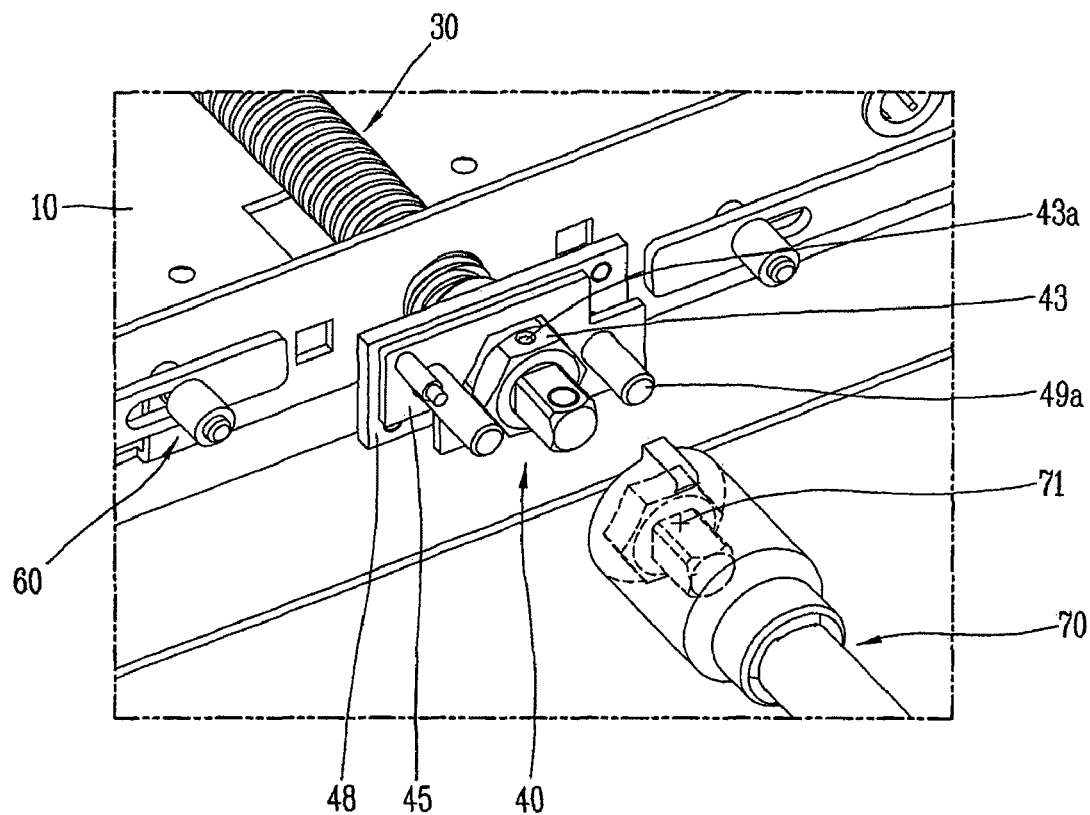
FIGS. 10 and 11 are exploded views of the transfer limiting unit of FIG. 7.
Figure 11:
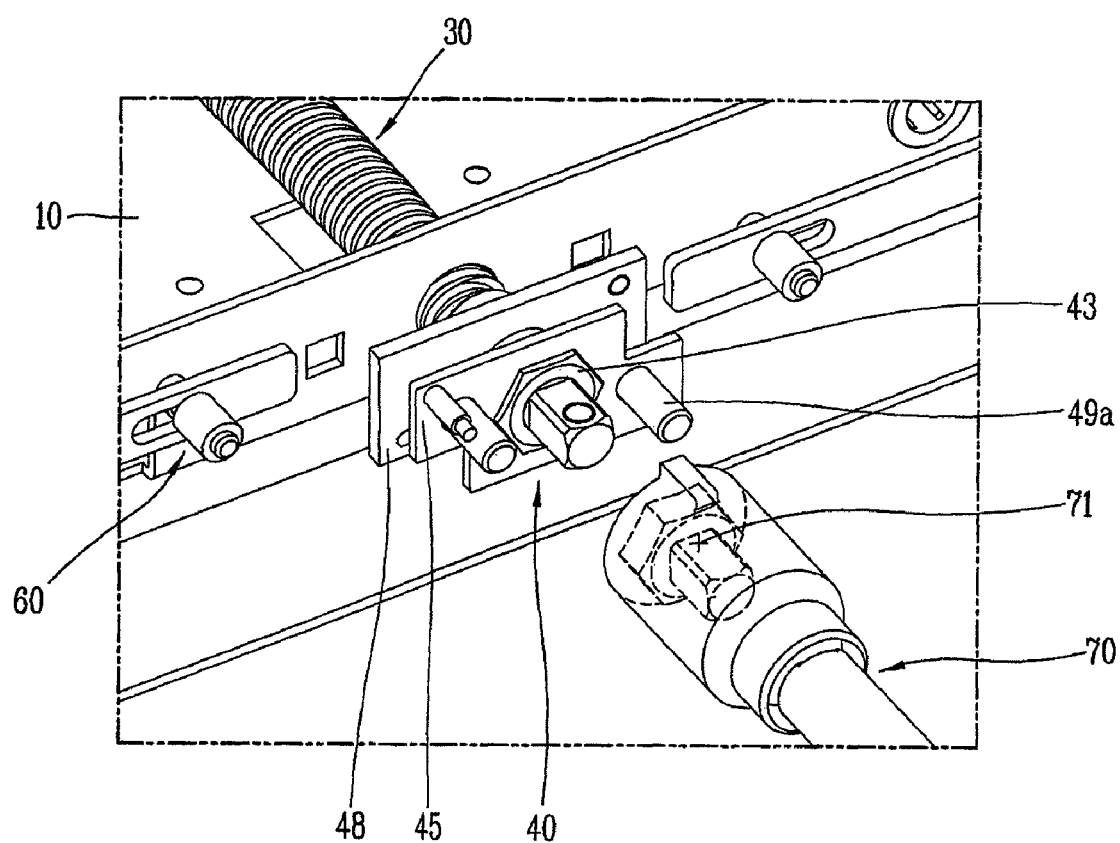

FIGS. 8 and 9 are enlarged perspective views of a transfer limiting unit of FIG. 7, and FIGS. 10 and 11 are exploded views of the transfer limiting unit of FIG. 7.

With reference to FIGS. 8 to 11, the transfer limiting unit 40 may be formed at the end portion of the second transfer unit 30 protruded from a front surface of the girder portion 60, and selectively limits the rotation of the second transfer unit 30.

The transfer limiting unit 40 includes a first polygonal protrusion portion 43 provided at one end portion of the second transfer unit 30, a first transfer limiting member 45 constraining the first polygonal protrusion portion 43 to limit the rotation of the second transfer unit 30, and an elastic support unit 47 elastically supporting the first transfer limiting member 45.

Accordingly, the transfer limiting unit 40 is configured to selectively limit the rotation of the second transfer unit 30 in a forward direction or reverse direction.

When the lever detachably fastened to one end portion of the second transfer unit 30 and rotating the second transfer unit 30 is separated, the transfer limiting unit 40 limits the rotation of the second transfer unit 30.

The first polygonal protrusion portion 43 is formed at one end portion of the second transfer unit 30 coupled to the lever 70. Also, a vertical section of the first polygonal protrusion portion 43 with respect to the direction in which the lever 70 is fastened has a polygonal shape.

A first polygonal recess portion 71 is formed at an end portion of the lever 70 fastened to the first polygonal protrusion portion 43 such that it corresponds to the first polygonal protrusion portion 43.

The first transfer limiting member 45 is coupled to be elastically supported by the girder portion 60, and when the lever 70 is separated, the first transfer limiting member 45 is positioned to be adjacent to an outer circumference of the first polygonal protrusion portion 43 to limit the rotation of the second transfer unit 30.

To this end, the first transfer limiting member 45 includes a transfer limiting hole 45a into which the first polygonal protrusion portion 45 is inserted when the lever 70 is separated.

The transfer limiting hole 45a may have a polygonal shape corresponding to the sectional shape of the first polygonal protrusion portion 43.

The elastic support unit 57 is configured to elastically support the first transfer limiting member 45 to provide a force of restitution in a direction in which the lever 70 is separated.

When the lever 70 is separated, the transfer limiting hole 45a formed on the first transfer limiting member 45 is moved by the force of restitution of the elastic support unit 57 so as to be inserted into the first polygonal protrusion portion 43.

The first polygonal protrusion portion 43 may be integrally formed with the second transfer unit 30. Alternatively, the first polygonal protrusion portion 43 may be formed as a polygonal nut screw-coupled with the second transfer unit 30. The first polygonal protrusion portion 43 and the second transfer unit may be coupled by means of a coupling wedge 43a that penetrate the two.

Meanwhile, the depth of the first polygonal recess portion 71 formed on the lever 70 may be longer than the length of the first polygonal protrusion portion 43.

When the lever 70 is fastened to the first polygonal protrusion portion 43, the first transfer limiting member 45 is pushed by the end of the lever 70 to release the first polygonal protrusion portion 43 constrained by the transfer limiting hole 45a. In this case, if the depth of the first polygonal recess portion 71 is smaller than or equal to the length of the first polygonal protrusion portion 43, a problem may arise in that the first polygonal protrusion portion 43 constrained by the transfer limiting hole 45a may not be released.

Preferably, a minimum radius of an outer circumscribed circle of the first polygonal protrusion portion 43 is larger than the radius of the second transfer unit 30.

If the minimum radius of an outer circumscribed circle of the first polygonal protrusion portion 43 is smaller than the radius of the second transfer unit 30, when the first transfer limiting member 45 is pushed to be moved by the tip of the lever 70, the transfer limiting hole 45a is caught by the second transfer unit 30, causing a problem in that the first transfer limiting member 45 does not move.

The elastic support unit 57 is formed between a front surface of the girder portion 60 and a rear surface of the first transfer limiting member 565 and may be provided as two or more compression springs.

Both ends of the compression spring may be coupled to the front surface of the girder portion 60 and the rear surface of the first transfer limiting member 45.

Here, if there is no room for the elastic support unit 57 to be coupled due to other components installed on the front surface of the girder portion 60, a connection member 58 may be provided fixedly on the front surface of the girder portion 60 and positioned spaced apart by a certain distance at the rear surface of the first transfer limiting member 45, and the elastic support unit 47 may be coupled to the connection member 58.

Meanwhile, a guide unit 49 may be further provided to guide the first transfer limiting member 45 so that the path, along which the first transfer limiting member 45 is pushed to be moved by the tip of the lever 70, can be uniformly maintained.

The guide unit 49 may include a guide protrusion 49a formed to be protruded in the direction in which the lever 70 is fastened from one of the front surface of the girder portion 60 and the rear surface of the first transfer limiting member 45, and a guide hole 49b formed on the other, into which the guide protrusion 49a is inserted, and guiding a movement direction of the first transfer limiting member 45.

The guide protrusion 49a or the guide hole 49b may be provided to the connection member 48 in place of the front surface of the girder portion 60.

Also, of course, the elastic support unit 47 may be inserted in the guide protrusion of the guide unit 49.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A withdrawable device of a vacuum circuit breaker for transferring a vacuum circuit breaker received in a cradle, the device comprising:
   a carriage on which the vacuum circuit breaker is loaded;
   a first transfer unit fixed to the carriage;
   a second transfer unit installed at one side of the cradle such that it can be driven, and transferring a transfer force to the first transfer unit; and
   a transfer limiting unit for selectively limiting driving of the second transfer unit,
   wherein the transfer limiting unit comprises:
   a first polygonal protrusion portion provided at one end portion of the second transfer unit;
   a first transfer limiting member constraining the first polygonal protrusion portion to limit the rotation of the second transfer unit; and
   an elastic support unit elastically supporting the first transfer limiting member.

2. The device of claim 1, wherein one side of the second transfer unit is bearing-supported at a girder portion, whose both ends are fixed to both sides of the cradle, so as to be axially rotatable.

3. The device of claim 2, wherein when the second transfer unit is rotated, the first transfer unit moves in an axial direction of the second transfer unit.

4. The device of claim 3, wherein the first transfer unit is provided as a nut member having a female screw unit, and the second transfer unit is provided as a shaft member having a male screw unit formed on an outer circumferential surface thereof such that it corresponds to the female screw unit of the nut member.

5. The device of claim 3, wherein the male screw unit of the second transfer unit is installed in a transfer direction of the first transfer unit.

6. The device of claim 2, wherein the transfer limiting unit may selectively limit a forward and reverse rotation of the second transfer unit.

7. The device of claim 1, wherein
   the first transfer limiting member further includes a transfer limiting hole formed to correspond to the vertical section of the first polygonal protrusion portion with respect to the fastening direction of the lever; and
   the elastic support unit elastically supports the first transfer limiting member such that a force of restitution is provided in a direction in which the lever is separated.

8. The device of claim 7, wherein the first polygonal protrusion portion is provided as a polygonal nut screw-coupled to the second transfer unit, and the first polygonal protrusion portion and the second transfer unit are coupled by a coupling wedge penetrating the first polygonal protrusion portion and the second transfer unit.

9. The device of claim 7, wherein a first polygonal recess portion corresponding to the first polygonal protrusion portion is formed at the end portion fastened to the first polygonal protrusion portion.

10. The device of claim 9, wherein the depth of the first polygonal recess portion is longer than the length of the first polygonal protrusion portion.

11. The device of claim 7, wherein a minimum radius of an outer circumscribed circle of the first polygonal protrusion portion is larger than the radius of the second transfer unit.

12. The device of claim 7, wherein the elastic support unit is provided between a front surface of the girder portion and a rear surface of the first transfer limiting member, and is provided as two or more compression springs.

13. The device of claim 12, wherein the transfer limiting unit comprises:
a guide unit including a guide protrusion formed to be protruded from one of the front surface of the girder portion and the rear surface of the first transfer limiting member toward the fastening direction of the lever, and a guide recess formed at the other to allow the guide protrusion to be inserted therein and guiding a movement direction of the first transfer limiting member.

14. The device of claim 13, wherein the guide unit is formed as the elastic support unit is inserted into the guide protrusion.

* * * * *